United States Patent
Toida (10) Patent No.: US 10,055,281 B2
(45) Date of Patent: Aug. 21, 2018

(54) SEMICONDUCTOR COMMUNICATION DEVICE, COMMUNICATION SYSTEM, AND COMMUNICATION METHOD

(71) Applicant: LAPIS SEMICONDUCTOR CO., LTD., Kanagawa (JP)

(72) Inventor: Hiroki Toida, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 3 days.

(21) Appl. No.: 15/165,224

(22) Filed: May 26, 2016

(65) Prior Publication Data

US 2016/0350176 A1    Dec. 1, 2016

(30) Foreign Application Priority Data

May 27, 2015 (JP) .................. 2015-106983

(51) Int. Cl.
*H03M 13/00* (2006.01)
*G06F 11/10* (2006.01)
*H04B 5/00* (2006.01)

(52) U.S. Cl.
CPC ....... *G06F 11/1004* (2013.01); *H04B 5/0062* (2013.01)

(58) Field of Classification Search
CPC ..... G06F 11/1004; H04B 5/0062; H04L 7/04; H04L 1/1822; H04L 1/1893; H04L 7/08; H04L 1/0045; H04L 1/0061; H04N 13/0438
See application file for complete search history.

(56) References Cited

U.S. PATENT DOCUMENTS

| 8,751,881 B1* | 6/2014 | Terry ............ H04L 1/0044 714/708 |
| 2005/0257117 A1* | 11/2005 | Chiang ............ H03M 13/09 714/758 |

FOREIGN PATENT DOCUMENTS

JP    2010-67035 A    3/2010

* cited by examiner

*Primary Examiner* — Guerrier Merant
(74) *Attorney, Agent, or Firm* — Kubotera & Associates, LLC (57) ABSTRACT

A semiconductor communication device includes a CRC calculation portion retrieving data pieces and CRC data piece as a retrieved data piece from a data signal, and performing a cyclic redundancy check calculation to obtain a CRC calculation value according to the retrieved data piece each time when the CRC calculation portion retrieves the retrieved data piece; a comparing portion generating an end detection signal indicating that the comparing portion detects a data end portion of the data signal when the CRC calculation value matches a value indicated with a subsequently retrieved data piece subsequently retrieved after the retrieved data piece is retrieved; and a communication responding portion determining whether the command is a non-corresponding command, and transmitting a command error signal when the communication responding portion determines that the command is the non-corresponding command.

9 Claims, 7 Drawing Sheets

SEMICONDUCTOR COMMUNICATION DEVICE, COMMUNICATION SYSTEM, AND COMMUNICATION METHOD

BACKGROUND OF THE INVENTION AND RELATED ART STATEMENT

The present invention relates to a semiconductor communication device that performs data communication. The present invention also relates to a communication system and a communication method.

In recent years, the NFC (Near Field Communication) has been focused on as a standard for short distance communication, in which communication can be established between two devices just putting one device close to the other device.

Patent Reference has disclosed an RFID (Radio Frequency Identification) system as a conventional communication system using the NFC. According to Patent Reference, the RFID system includes an IC (Integrated Circuit) tag formed of a semiconductor communication chip and a reader for reading data from the IC tag through non-contact communication.

PATENT REFERENCE

Japanese Patent Publication No. 2010-67035.

In the conventional communication system using the NFC, the reader is configured to wait for a response from the IC tag for a specific period of time after the reader transmits a command for requesting data reading. At this moment, when the reader does not receive the response from the IC tag until the specific period of time is elapsed, the reader determines that time is out, and proceeds to a transmission process for transmitting a next command.

Accordingly, in the conventional communication system, when the reader does not receive the response from the IC tag even though the reader transmits the command for requesting the data reading, the reader is not capable of performing a next process for the specific period of time, thereby lowering communication efficiency.

In view of the problems of the conventional communication system described above, an object of the present invention is to provide a semiconductor communication device, a communication system, and an communication method capable of improving the communication efficiency.

Further objects and advantages of the invention will be apparent from the following description of the invention.

SUMMARY OF THE INVENTION

In order to attain the objects described above, according to a first aspect of the present invention, a semiconductor communication device is configured to receive a data signal, in which a CRC (Cyclic Redundancy Check) data piece is arranged after a series of a plurality of data pieces. The data pieces represent a command, and the CRC data piece represents a value calculated with a cyclic redundancy check calculation based on the data pieces. Then, the semiconductor communication device is configured to perform transmission according to the command.

According to the first aspect of the present invention, the semiconductor communication device includes a CRC calculation portion; a comparing portion; and a communication responding portion.

According to the first aspect of the present invention, the CRC calculation portion is configured to retrieve each of the data pieces and the CRC data piece as a retrieved data piece from the data signal thus received. Further, the CRC calculation portion is configured to perform the cyclic redundancy check calculation to obtain a CRC calculation value according to the retrieved data piece each time when the CRC calculation portion retrieves the retrieved data piece.

According to the first aspect of the present invention, the comparing portion is configured to generate an end detection signal indicating that the comparing portion detects a data end portion of the data signal when the CRC calculation value matches a value indicated with a subsequently retrieved data piece following the retrieved data piece.

According to the first aspect of the present invention, the communication responding portion is configured to determine whether the command represented with the retrieved data piece is a non-corresponding command. Further, the communication responding portion is configured to transmit a command error signal when the communication responding portion determines that the command is the non-corresponding command.

According to a second aspect of the present invention, a wireless reader writer and a semiconductor tag. The wireless reader writer is configured to wirelessly transmit a data signal, in which a CRC (Cyclic Redundancy Check) data piece is arranged after a series of a plurality of data pieces. The data pieces represent a command, and the CRC data pieces represents a value calculated with a cyclic redundancy check calculation based on the data pieces. The semiconductor tag is configured to receive the data signal, and to perform wireless transmission with the wireless reader writer according to the command.

According to the second aspect of the present invention, the semiconductor tag includes a CRC calculation portion; a comparing portion; and a communication responding portion.

According to the second aspect of the present invention, the CRC calculation portion is configured to retrieve each of the data pieces and the CRC data piece as a retrieved data piece from the data signal thus received. Further, the CRC calculation portion is configured to perform the cyclic redundancy check calculation to obtain a CRC calculation value according to the retrieved data piece each time when the CRC calculation portion retrieves the retrieved data piece.

According to the second aspect of the present invention, the comparing portion is configured to generate an end detection signal indicating that the comparing portion detects a data end portion of the data signal when the CRC calculation value matches a value indicated with a subsequently retrieved data piece following the retrieved data piece.

According to the second aspect of the present invention, the communication responding portion is configured to determine whether the command represented with the retrieved data piece is a non-corresponding command. Further, the communication responding portion is configured to transmit a command error signal when the communication responding portion determines that the command is the non-corresponding command.

According to a third aspect of the present invention, a communication method is provided for a semiconductor communication device configured to receive a data signal, in which a CRC (Cyclic Redundancy Check) data piece is arranged after a series of a plurality of data pieces. The data pieces represent a command, and the CRC data pieces represents a value calculated with a cyclic redundancy check calculation based on the data pieces. Then, the semiconductor communication device is configured to perform transmission according to the command.

According to the third aspect of the present invention, the communication method includes a step of retrieving each of the data pieces and the CRC data piece as a retrieved data piece from the data signal thus received, and a step of performing the cyclic redundancy check calculation to obtain a CRC calculation value according to the retrieved data piece each time when the CRC calculation portion retrieves the retrieved data piece.

According to the third aspect of the present invention, the communication method further includes a step of retrieving a subsequently retrieved data piece following the retrieved data piece as the subsequently retrieved data piece, and a step of transmitting a command error signal when the CRC calculation value matches a value indicated with the subsequently retrieved data piece, and the communication responding portion determines that the command is the non-corresponding command.

According to the present invention, in the data signal, the CRC data piece is arranged after a series of the data pieces representing the command. When the data signal is received, each of the data pieces and the CRC data piece is sequentially retrieved as the retrieved data piece. Then, the cyclic redundancy check calculation is performed to obtain the CRC calculation value according to the retrieved data piece each time when the retrieved data piece is retrieved.

According to the present invention, when an error is not occurred in the data pieces and the CRC data piece, the CRC calculation value calculated when the data piece at the end is retrieved matches to the value of the CRC calculation value arranged after the data piece at the end. Accordingly, when the CRC calculation value calculated each time when the data piece is retrieved matches to the value of the subsequently retrieved data piece after the data piece, it is determined to be the end of the data signal. At this moment, when it is determined that the command represented with the subsequently retrieved data piece is the non-corresponding command, the command error signal is transmitted at the timing of the end portion of the data signal.

As described above, according to the present invention, it is possible to transmit the command error signal at an earlier timing as opposed to a case, in which the end portion data arranged after the CRC data piece and indicating the end portion of the data signal is detected, and the command error signal is transmitted at the detection timing. Accordingly, it is possible to improve communication efficiency.

DETAILED DESCRIPTION OF PREFERRED EMBODIMENTS

Hereunder, preferred embodiments of the present invention will be explained with reference to the accompanying drawings.

First Embodiment

Figure 1:
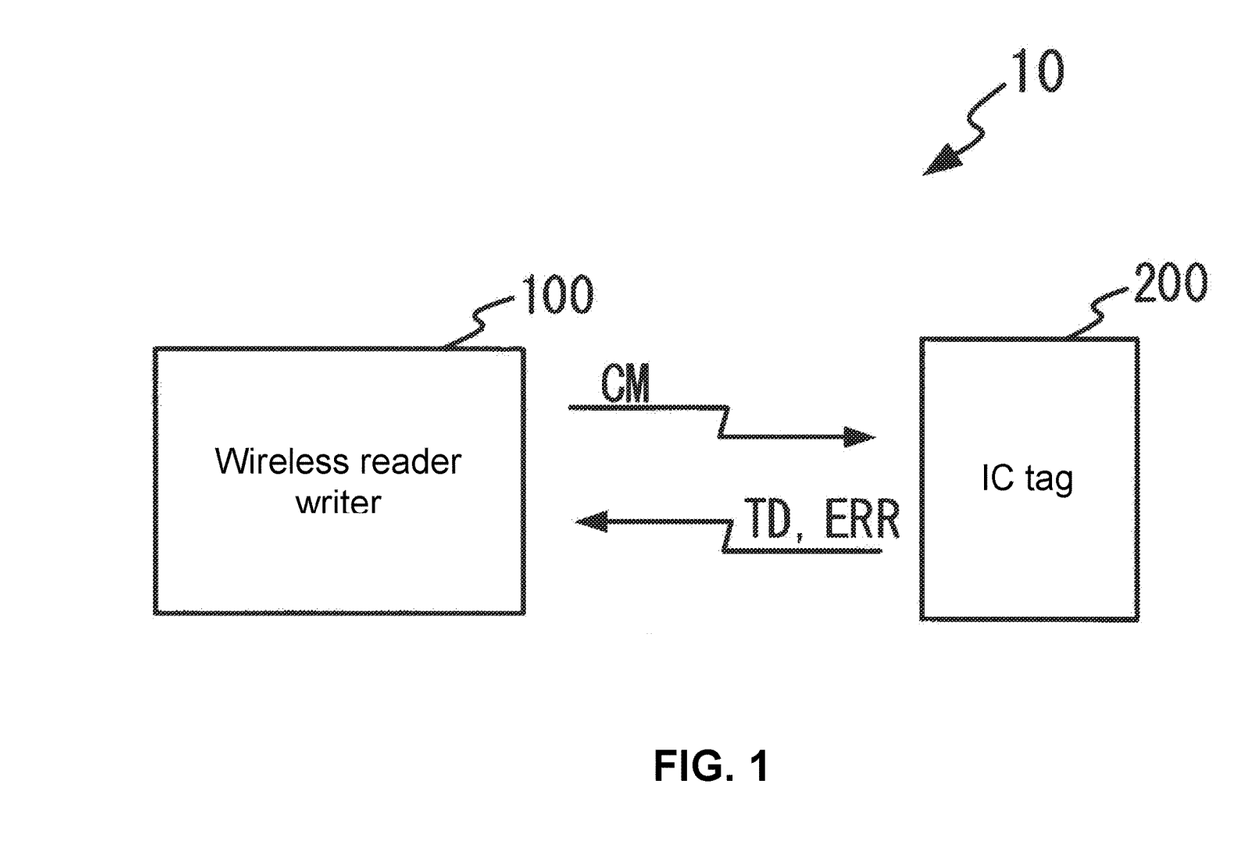
FIG. 1 is a block diagram showing a configuration of a communication system including a semiconductor communication device according to a first embodiment of the present invention.

A first embodiment of the present invention will be explained. FIG. 1 is a block diagram showing a configuration of a communication system 10 including a semiconductor communication device according to the first embodiment of the present invention.

As shown in FIG. 1, the communication system 10 includes a wireless reader writer 100 and an IC (Integrated Circuit) tag 200 as the semiconductor communication device. In the communication system 10, the wireless reader writer 100 is configured to establish communication with the IC tag 200 through wireless communication according to, for example, the NFC (Near Field Communication) standard.

In the first embodiment, the wireless reader writer 100 is configured to access to the IC tag 200. More specifically, the wireless reader writer 100 is configured to read various tag information stored in advance in the IC tag 200 such as an identification code, attribution information, communication history information, and the like. Further, the wireless reader writer 100 is configured to write communication history and the like. It should be noted that the IC tag 200 may be categorized to various types according to a function and a specification of the tag.

In the first embodiment, the wireless reader writer 100 is further configured to demodulate a wireless carrier wave signal with a command data signal CM representing various commands defined according to the type of the IC tag 200, so that the wireless reader writer 100 transmits a wireless transmission wave representing the command data signal CM to the IC tag 200.

Figure 2:
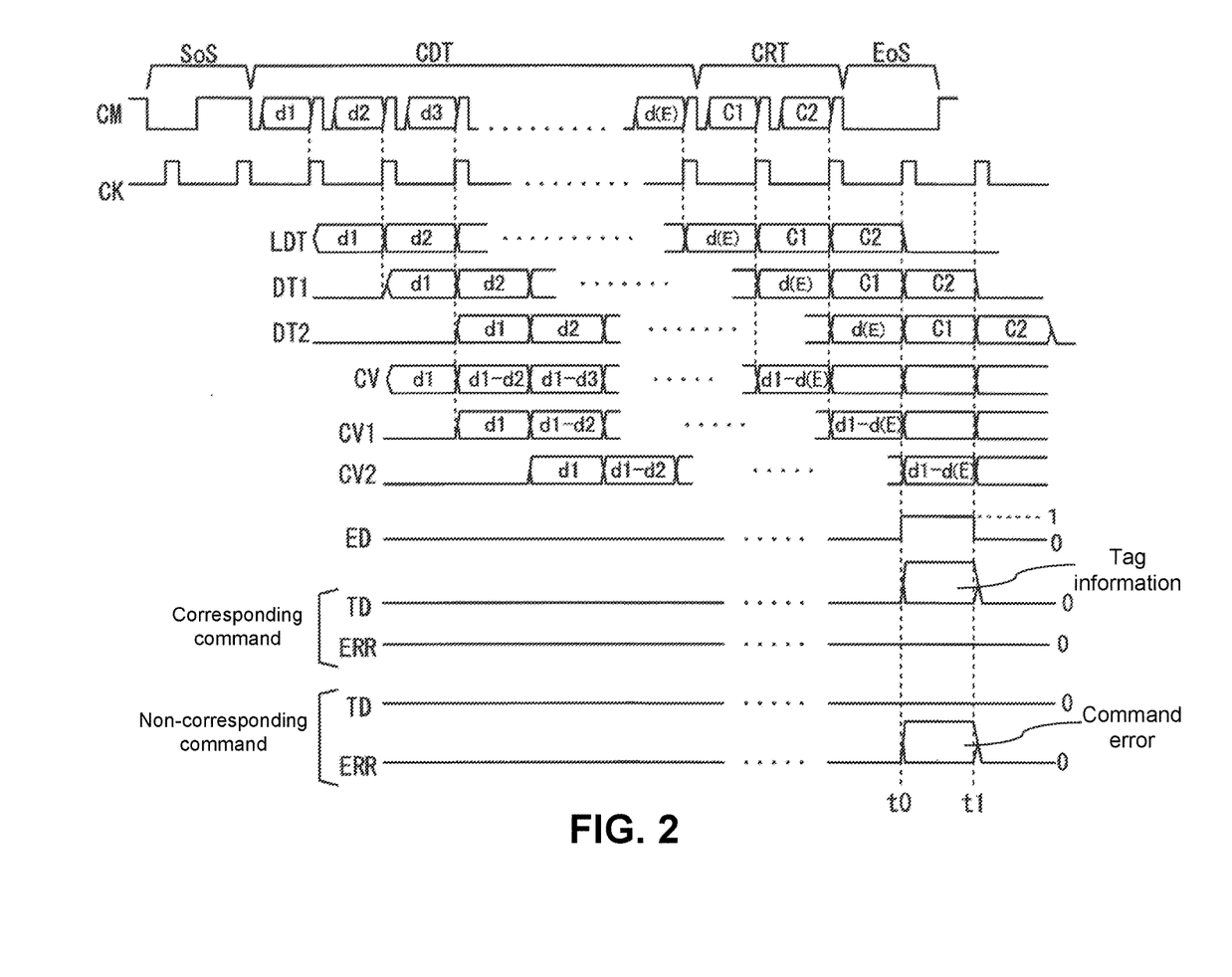
FIG. 2 is a time chart showing an operation of the communication system according to the first embodiment of the present invention.

FIG. 2 is a time chart showing an operation of the communication system 10 according to the first embodiment of the present invention. In the time chart, an example of a format of the command data signal CM is presented.

As shown in FIG. 2, the command data signal CM is a serial data signal formed of a series of data bits of two values. Further, the command data signal CM includes a header portion SoS, a command data portion CDT, a CRC (Cyclic Redundancy Check) data portion CRT, and an end portion EoS.

In the first embodiment, the header portion SoS has a serial bit pattern specifically representing a header of the command data signal CM. The command data portion CDT is formed of a series of data d1 to d(E) (E is an integer greater than 2) representing a command for accessing the IC tag 200. It should be noted that each of the data d1 to d(E) is formed of a series of data bits of two values for eight bits.

In the first embodiment, the CRC data portion CRT is formed of data representing a value with 16 bits obtained through performing a cyclic redundancy check calculation to all bits of the command data portion CDT, that is, data of 8×E bits of the data d1 to d(E). Further, the CRC data portion CRT is formed of a CRC data C1 and a CRC data C2. The CRC data C1 represents upper 8 bits of the 16 bits data with a series of serial bits of two values. The CRC data C2 represents lower 8 bits of the 16 bits data with a series of serial bits of two values. The end portion EoS is formed of an end data having a specific bit pattern representing an end portion of the command data signal CM.

In the first embodiment, when the wireless reader writer 100 receives the wireless transmission wave transmitted from the IC tag 200, the wireless reader writer 100 performs a wave detection process and a demodulation process to the wireless transmission wave. Accordingly, the wireless reader writer 100 obtains a tag data signal representing the tag information such as the identification code, the attribution information, the communication history information, and the like. Alternatively, the wireless reader writer 100 obtains a command error signal ERR.

Figure 3:
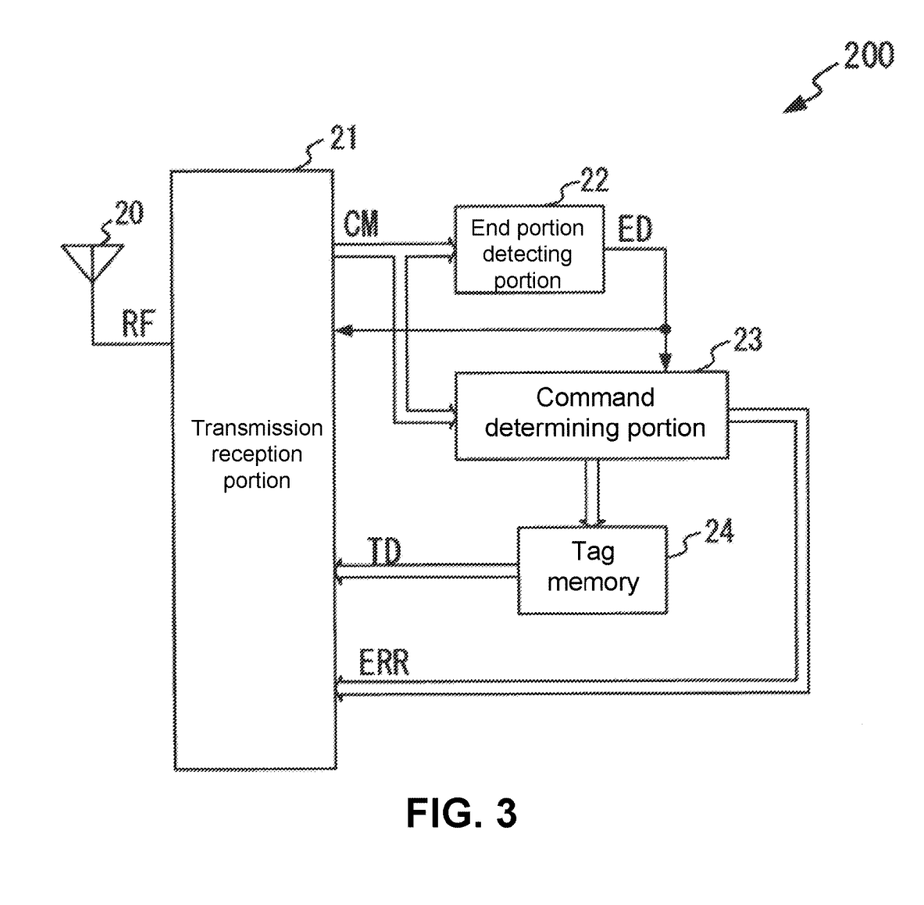
FIG. 3 is a block diagram showing a configuration of an IC (Integrated Circuit) tag as the semiconductor communication device of the communication system according to the first embodiment of the present invention.

FIG. 3 is a block diagram showing a configuration of the IC (Integrated Circuit) tag 200 as the semiconductor communication device of the communication system 10 according to the first embodiment of the present invention.

As shown in FIG. 3, the IC tag 200 includes an antenna 20; a transmission reception portion 21; an end portion detecting portion 22; a command determining portion 23; and a tag memory 24. When the antenna 20 receives the wireless transmission wave transmitted from the wireless reader writer 100, the antenna 20 obtains a high frequency signal RF, so that the antenna 20 supplies the high frequency signal RF to the transmission reception portion 21.

In the first embodiment, the end portion detecting portion 22 is configured to detect the end portion of the data of the command data signal CM. Further, the end portion detecting portion 22 is configured to generate an end detection signal ED. The end detection signal ED has, for example, a logic level "0" during a period of time before the end portion detecting portion 22 detects the end portion of the data. When the end portion detecting portion 22 detects the end portion of the data, the end detection signal ED has a logic level "1" transited from the logic level "0". Further, the end portion detecting portion 22 is configured to supply the end detection signal ED to the transmission reception portion 21 and the command determining portion 23.

Figure 4:
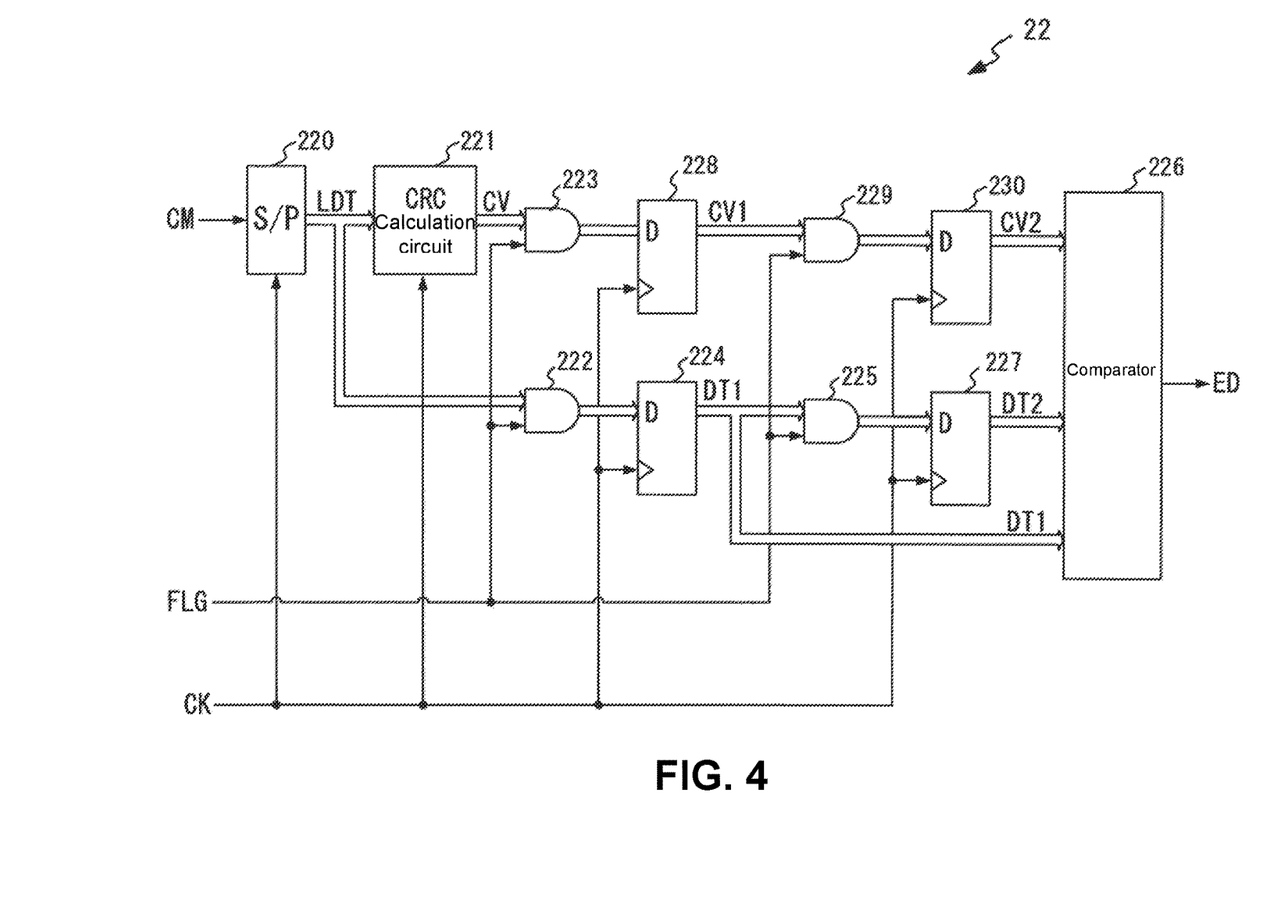
FIG. 4 is a circuit diagram showing a configuration of an end portion detection portion of the IC tag of the communication system according to the first embodiment of the present invention.

FIG. 4 is a circuit diagram showing a configuration of the end portion detection portion 22 of the IC tag 200 of the communication system 10 according to the first embodiment of the present invention.

As shown in FIG. 4, the end portion detecting portion 22 includes a serial parallel conversion circuit 220; a CRC calculation circuit 221; an AND gate 222; and an AND gate 223. The serial parallel conversion circuit 220 is configured to sequentially retrieve the command data signal CM per one bit, and to convert the data thus retrieved into a series of data LDT that is parallel per eight bits and is synchronized with a clock signal CK shown in FIG. 2. Further, the serial parallel conversion circuit 220 is configured to supply the series of the data LDT to the CRC calculation circuit 221 and the AND gate 222. More specifically, the serial parallel conversion circuit 220 retrieves each of data pieces formed of the data d1 to d(E), the CRC data C1, and the CRC data C2 contained in the command data signal CM shown in FIG. 2 as the data LDT that is parallel per eight bits. Then, the serial parallel conversion circuit 220 supplies the data LDT to the CRC calculation circuit 221 and the AND gate 222.

In the first embodiment, the CRC calculation circuit 221 is configured to sequentially retrieve the series of the data LDT that is synchronized with the clock signal CK. Each time when the CRC calculation circuit 221 retrieves one of the data LDT, the CRC calculation circuit 221 performs the cyclic redundancy check calculation according to a data value of each of the data LDT thus retrieved to obtain a CRC calculation value. Then, the CRC calculation circuit 221 is configured to supply the CRC calculation value, for example, a CRC calculation value CV represented with 16 bits, to the AND gate 223.

More specifically, in the first embodiment, as shown in FIG. 2, when the CRC calculation circuit 221 retrieves a first data d1 as the data LDT, the CRC calculation circuit 221 performs the cyclic redundancy check calculation according to the data d1, so that the CRC calculation circuit 221 obtains the CRC calculation value CV of 16 bits.

In the next step, when the CRC calculation circuit 221 retrieves a next data d2, the CRC calculation circuit 221 performs the cyclic redundancy check calculation according to the data d1 and the data d2, so that the CRC calculation circuit 221 obtains the CRC calculation value CV of 16 bits.

In the next step, when the CRC calculation circuit 221 retrieves a next data d2, the CRC calculation circuit 221 performs the cyclic redundancy check calculation according to the data d1, the data d2, and the data d3, so that the CRC calculation circuit 221 obtains the CRC calculation value CV of 16 bits. Accordingly, after the CRC calculation circuit 221 retrieves all data of the command data portion CDT, that is, all data from the first data d1 to the last data d(E), the CRC calculation circuit 221 obtains the CRC calculation value CV representing a result of the cyclic redundancy check calculation according to all data from the first data d1 to the last data d(E). At this moment, if all data from the first data d1 to the last data d(E) do not have an error, the CRC calculation value CV becomes identical to the CRC data (C1, C2) of 16 bits, that is a combination of the CRC data C1 and the CRC data C2 contained in the CRC data portion CRT.

In the first embodiment, the end portion detecting portion 22 further includes an eight bit latch 224; an AND gate 225; a comparator 226; and an eight bit latch 227. When an operation signal FLG with the logic level "1" is supplied to the AND gate 222, the end portion detecting portion 22 is set to an unable state. The AND gate 222 is configured to supply the data LDT supplied from the serial parallel conversion circuit 220 to the eight bit latch 224 only when the operation signal FLG with the logic level "1" is supplied to the AND gate 222. When the AND gate 222 supplies the data LDT of eight bits to the eight bit latch 224, the eight bit latch 224 is configured to retrieve the data LDT according to the clock signal CK. Then, the eight bit latch 224 supplies the data LDT as a data DT1 to the AND gate 225 and the comparator 226.

In the first embodiment, the AND gate 225 is configured to supply the data DT1 supplied from the eight bit latch 224 to the eight bit latch 227 only when the operation signal FLG with the logic level "1" is supplied to the AND gate 225. When the AND gate 225 supplies the data DT1 to the eight bit latch 227, the eight bit latch 227 is configured to retrieve the data DT1 according to the clock signal CK. Then, the eight bit latch 227 supplies the data DT1 as a data DT2 to the comparator 226.

In the first embodiment, the end portion detecting portion 22 further includes a 16 bit latch 228; an AND gate 229; and a 16 bit latch 230. The AND gate 223 is configured to supply the CRC calculation value data CV of 16 bits supplied from the CRC calculation circuit 221 to the 16 bit latch 228 only when the operation signal FLG with the logic level "1" is supplied to the AND gate 223. When the AND gate 223 supplies the CRC calculation value data CV of 16 bits to the 16 bit latch 228, the 16 bit latch 228 is configured to retrieve the CRC calculation value data CV according to the clock signal CK. Then, the 16 bit latch 228 supplies the CRC calculation value data CV as a CRC calculation value data CV1 to the AND gate 229.

In the first embodiment, the AND gate 229 is configured to supply the CRC calculation value data CV1 supplied from the 16 bit latch 228 to the 16 bit latch 230 only when the operation signal FLG with the logic level "1" is supplied to the AND gate 229. When the AND gate 229 supplies the CRC calculation value data CV1 to the 16 bit latch 230, the 16 bit latch 230 is configured to retrieve the CRC calculation value data CV1 according to the clock signal CK. Then, the 16 bit latch 230 supplies the CRC calculation value data CV1 as a CRC calculation value data CV2 to the comparator 226.

In the first embodiment, the comparator 226 is configured to obtain data (DT1, DT2) of 16 bits through combining eight bits represented with the data DT1 as an upper bit group and eight bits represented with the data DT2 as a lower bit group. Then, the comparator 226 is configured to compare the data (DT1, DT2) of 16 bits with the CRC calculation value data CV2 of 16 bits. When the comparator 226 determines that the data (DT1, DT2) is identical to the CRC calculation value data CV2, the comparator 226 outputs a signal with the logic level "1" as the end detection signal ED. When the comparator 226 determines that the data (DT1, DT2) is different from the CRC calculation value data CV2, the comparator 226 outputs a signal with the logic level "0" as the end detection signal ED.

In the first embodiment, with the configuration shown in FIG. 4, the end portion detecting portion 22 sequentially retrieves the data pieces (LDT) of eight bits in the command data signal CM that is formed of the data d1 to d(E) and the CRC data C1 and C2. Further, every time when the end portion detecting portion 22 retrieves one data piece, the end portion detecting portion 22 performs the CRC check through the following steps.

In the first embodiment, in the first step, the end portion detecting portion 22 performs the cyclic redundancy check calculation based on all of the data pieces the end portion detecting portion 22 has retrieved up to the timing, so that the end portion detecting portion 22 obtains the CRC calculation data (CV2) of 16 bits. In the next step, the end portion detecting portion 22 combines the data piece (DT1) of eight bits that is retrieved right after the one data piece is retrieved with the data piece (DT2) of eight bits that is retrieved right after the data piece (DT1) is retrieved, so that the end portion detecting portion 22 obtains the data piece of 16 bits. In the next step, the end portion detecting portion 22 determines whether the data piece of 16 bits matches to the CRC calculation data (CV2).

In the first embodiment, the end portion detecting portion 22 performs the CRC check through the steps described above. Accordingly, the end portion detecting portion 22 determines whether the CRC calculation data (CV2), which is calculated when the one data piece is retrieved, matches to the data pieces (DT1, DT2) of 16 bits, which are retrieved right after the one data piece is retrieved. When the end portion detecting portion 22 determines that the CRC calculation data (CV2) matches to the data pieces (DT1, DT2), the end portion detecting portion 22 generates the end detection signal ED with the logic level "1" indicating that the end portion detecting portion 22 detects the data end portion.

More specifically, in the first embodiment, as described above, in the command data signal CM, the CRC data C1 and C2 are arranged right after the series of the data d1 to d(E) representing the command. The CRC data C1 and C2 represent the CRC values calculated in advance through the cyclic redundancy check calculation based on the data d1 to d(E).

Accordingly, in the first embodiment, if there is no bit error in the command data signal CM thus received, only the CRC calculation data (CV2) of 16 bits, which is calculated when the data piece (E) among the data d1 to d(E) is retrieved, matches to the data of 16 bits, which is the combination of the CRC data C1 and C2. When the CRC calculation data (CV2) matches to the data of 16 bits, all of the data d1 to d(E) in the command data portion CDT are retrieved.

Accordingly, in the first embodiment, when the end portion detecting portion 22 determines through the CRC check that the CRC calculation data (CV2) matches to the data pieces (DT1, DT2), the end portion detecting portion 22 generates the end detection signal ED indicating that the end portion detecting portion 22 detects the data end portion at that timing. Then, the end portion detecting portion 22 supplies the end detection signal ED to the transmission reception portion 21 and the command determining portion 23 constituting a communication responding portion.

In the first embodiment, the command determining portion 23 is configured to sequentially retrieve the data d1 to d(E) in the command data signal CM. Further, the command determining portion 23 is configured to determine whether the command represented with the data d1 to d(E) is a corresponding command or a non-corresponding command according to the end detection signal ED indicating the data end portion.

In the first embodiment, when the command determining portion 23 determines that the command is the non-corresponding command, the command determining portion 23 supplies the command error signal ERR indicating that the command is the non-corresponding command to the transmission reception portion 21 as shown in FIG. 2. On the other hand, when the command determining portion 23 determines that the command is the corresponding command, the command determining portion 23 supplies a reading signal or a writing signal represented with the command thus received to the tag memory 24 according to the end detection signal ED.

In the first embodiment, the tag memory 24 is configured to store the various tag information in advance such as the identification code, the attribution information, the communication history information, and the like. When the tag memory 24 receives the writing signal supplied from the command determining portion 23, the tag memory 24 rewrites, for example, the communication history information. Further, the tag memory 24 receives the reading signal supplied from the command determining portion 23, the tag memory 24 reads out, for example, the identification code. Then, the command determining portion 23 supplies the tag data signal TD representing the identification code as the tag information to the transmission reception portion 21.

In the first embodiment, when the transmission reception portion 21 receives the command error signal ERR or the tag data signal TD, the transmission reception portion 21 transmits the high frequency signal RF through the antenna 20 to the wireless reader writer 100 obtained through demodulating the wireless carrier wave signal with the command error signal ERR or the tag data signal TD according to the end detection signal ED with the logic level "1".

An operation of the IC tag 200 and the wireless reader writer 100 having the configurations described above will be explained next with reference to a communication flow shown in FIG. 5.

Figure 5:
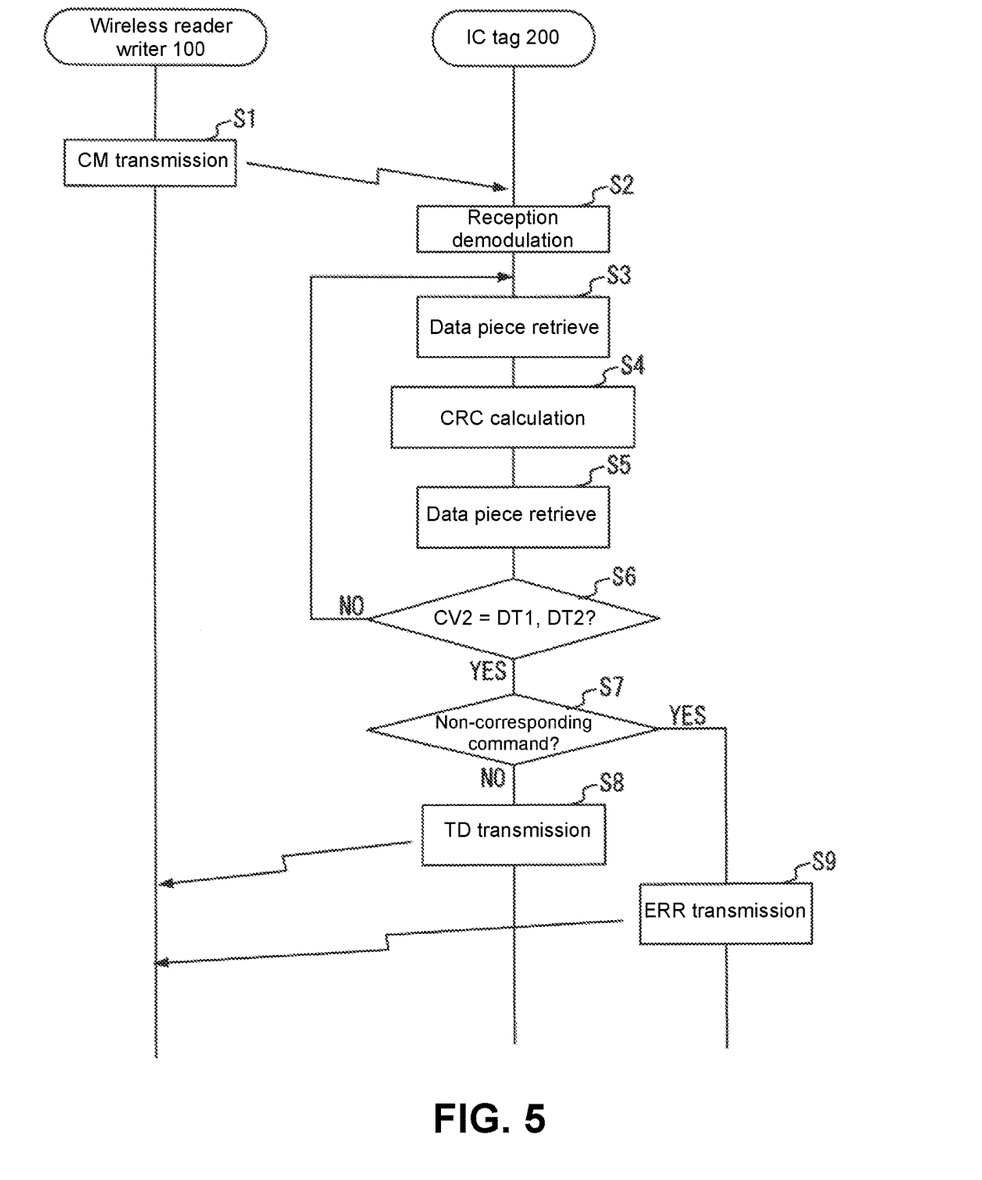
FIG. 5 is a flow chart showing the operation of the communication system according to the first embodiment of the present invention.

FIG. 5 is a flow chart showing the operation of the communication system 10 according to the first embodiment of the present invention.

As shown in FIG. 5, in step S1, the wireless reader writer 100 transmits the wireless transmission wave representing the command data signal CM shown in FIG. 2. In step S2, when the IC tag 200 is situated at a location close to the wireless reader writer 100, the IC tag 200 receives the wireless transmission wave and demodulates the command data signal CM. In step S3, the IC tag 200 retrieves sequentially one by one the series of the data pieces formed of the data d1 to d(E), the CRC data C1, and the CRC data C2 contained in the command data signal CM.

After the IC tag 200 retrieves the series of the data pieces in step S3, the IC tag 200 performs the CRC check through the following steps S4 to S6. In step S4, the IC tag 200 performs the cyclic redundancy check calculation based on all the data pieces retrieved up to this moment, so that the IC tag 200 calculates the CRC calculation value to obtain the CRC calculation value data (CV2).

In step S5, the IC tag 200 sequentially retrieves the data piece (DT1) following right after one of the data pieces retrieved step S3 and the data piece (DT2) following right after the data piece (DT1). Then, the IC tag 200 combines the data piece (DT1) and the data piece (DT2) to obtain the data piece of 16 bits (DT1, DT2).

In step S6, the IC tag 200 determines whether the CRC calculation value data (CV2) of 16 bits calculated in step S4 matches to the data piece of 16 bits (DT1, DT2) obtained in step S5. When the IC tag 200 determines that the CRC calculation value data (CV2) does not match to the data piece (DT1, DT2), the IC tag 200 returns to step S3, so that the process from step S3 to step S6 is repeated.

On the other hand, when the IC tag 200 determines that the CRC calculation value data (CV2) matches to the data piece (DT1, DT2), it is determined that the IC tag 200 retrieves all of the data d1 to d(E), the CRC data C1, and the CRC data C2 contained in the command data signal CM at this timing. Accordingly, the end portion detecting portion 22 of the IC tag 200 detects this timing as the data end portion of the command data signal CM.

In step S7, when the IC tag 200 determines that the CRC calculation value data (CV2) matches to the data piece (DT1, DT2) in step S6, the IC tag 200 determines whether the command represented with the data d1 to d(E) is a non-corresponding command that does not correspond to the IC tag 200.

In step S8, when the IC tag 200 determines that the command is not the non-corresponding command in step S7, the IC tag 200 reads the tag information specified with the command represented with the data d1 to d(E) from the tag memory 24. Further, the IC tag 200 transmits the tag data signal TD representing the tag information wirelessly to the wireless reader writer 100.

In step S9, when the IC tag 200 determines that the command is the non-corresponding command in step S7, the IC tag 200 transmits the command error signal ERR representing that the command thus received is the non-corresponding command to the wireless reader writer 100.

As described above, in the first embodiment, the IC tag 200 retrieves sequentially one by one the series of the data pieces formed of the data d1 to d(E) representing the command. Further, each time when the IC tag 200 retrieves the data piece, the IC tag 200 calculates the CRC calculation value (CV2). When the IC tag 200 determines that the CRC calculation value data (CV2) thus calculated matches to the data piece (DT1, DT2) right after the one of the data pieces thus retrieved, it is determined that the IC tag 200 retrieves all of the data d1 to d(E), the CRC data C1, and the CRC data C2 contained in the command data signal CM at the timing t0 shown in FIG. 2. Accordingly, the end portion detecting portion 22 of the IC tag 200 detects the timing t0 as the data end portion of the command data signal CM.

Further, in the first embodiment, when the IC tag 200 determines that the command represented with the data d1 to d(E) is the non-corresponding command that does not corresponds to the IC tag 200, the IC tag 200 transmits the command error signal ERR representing that the command thus received is the non-corresponding command to the wireless reader writer 100 at the timing t0 when the data end portion is detected.

Accordingly, in the first embodiment, the IC tag 200 is capable of transmitting the command error signal ERR at the timing t0 before the timing t1 shown in FIG. 2, when the end portion EoS can be detected without detecting the end portion EoS of the command data signal CM shown in FIG. 2.

Accordingly, in the first embodiment, it is not necessary to provide a detection circuit for detecting the end portion EoS, and it is possible to reduce a size of the IC tag 200 by a space of the detection circuit. Further, the IC tag 200 is capable of transmitting the command error signal ERR at the timing t0 earlier than the case that the IC tag 200 transmits the command error signal ERR at the detection timing of the command error signal ERR. Accordingly, it is possible to improve communication efficiency.

In the first embodiment, the IC tag 200 receives the command data signal CM in which the CRC data C1 and the CRC data 2 are arranged right after the series of the data d1 to d(E) representing the command. It should be noted that the CRC data C1 and the CRC data 2 may be arranged after the series of the data d1 to d(E), and the CRC data C1 and the CRC data 2 do not need to be arranged right after the series of the data d1 to d(E).

In the first embodiment, in the command data signal CM, the CRC calculation value based on the data d1 to d(E) is represented with the two data, that is, the CRC data C1 and the CRC data C2. Alternatively, when it is possible to represent the CRC calculation value with a bit length the same as that of each of the data d1 to d(E), only one data, that is, the CRC data C1 may be arranged after the series of the data d1 to d(E).

More specifically, in the first embodiment, the IC tag 200 receives the data signal. In the data signal, the CRC data pieces are arranged after the series of the data pieces representing the command, and the CRC data represents the value obtained through the cyclic redundancy check calculation according to the data pieces. Then, the IC tag 200 transmits the command. In the IC tag 200, the CRC calculation circuit 221 sequentially retrieves one by one as the data piece (LDT) the data pieces formed of the data d1 to d(E), the CRC data C1, and the CRC data C2 from the data signal (the command data signal CM) thus received.

In the first embodiment, each time when the data piece is retrieved, the CRC calculation circuit 221 performs the cyclic redundancy check calculation according to the data pieces retrieved up to the timing, so that the CRC calculation circuit 221 obtains the CRC calculation value (CV2). When the comparator 226 determines that the value represented with the data piece (DT2) retrieved after the data piece is retrieved matches to the CRC calculation value, the comparator 226 generates the end detection signal ED indicating that the data end portion of the data signal is detected. At this moment, the communication responding portion (the transmission reception portion 21 and the command determining portion 23) determines whether the command represented with the data pieces thus retrieved is the non-corresponding command. When the communication responding portion determines that the command is the non-corresponding command, the communication responding portion transmits the command error signal (ERR).

Second Embodiment

A second embodiment of the present invention will be explained next.

In the first embodiment, it is assumed that a bit error does not occur in the command data signal CM received. In an actual situation when the bit error occurs due to an adverse effect of a deteriorated communication state or an environmental noise, it is difficult to detect the data end portion with the end detection signal ED. If the data end portion is not detected, the IC tag 200 does not transmit the tag data signal TD or the command error signal ERR to the wireless reader writer 100 in step S8 or step S9 shown in FIG. 5. Accordingly, during the idle time until the wireless reader writer 100 until the wireless reader writer 100 determines the time out, the IC tag 200 repeats the process between step S3 and step S6 shown in FIG. 5. In particular, the cyclic redundancy check calculation is repeated in step S4, thereby increasing power consumption.

Figure 6:
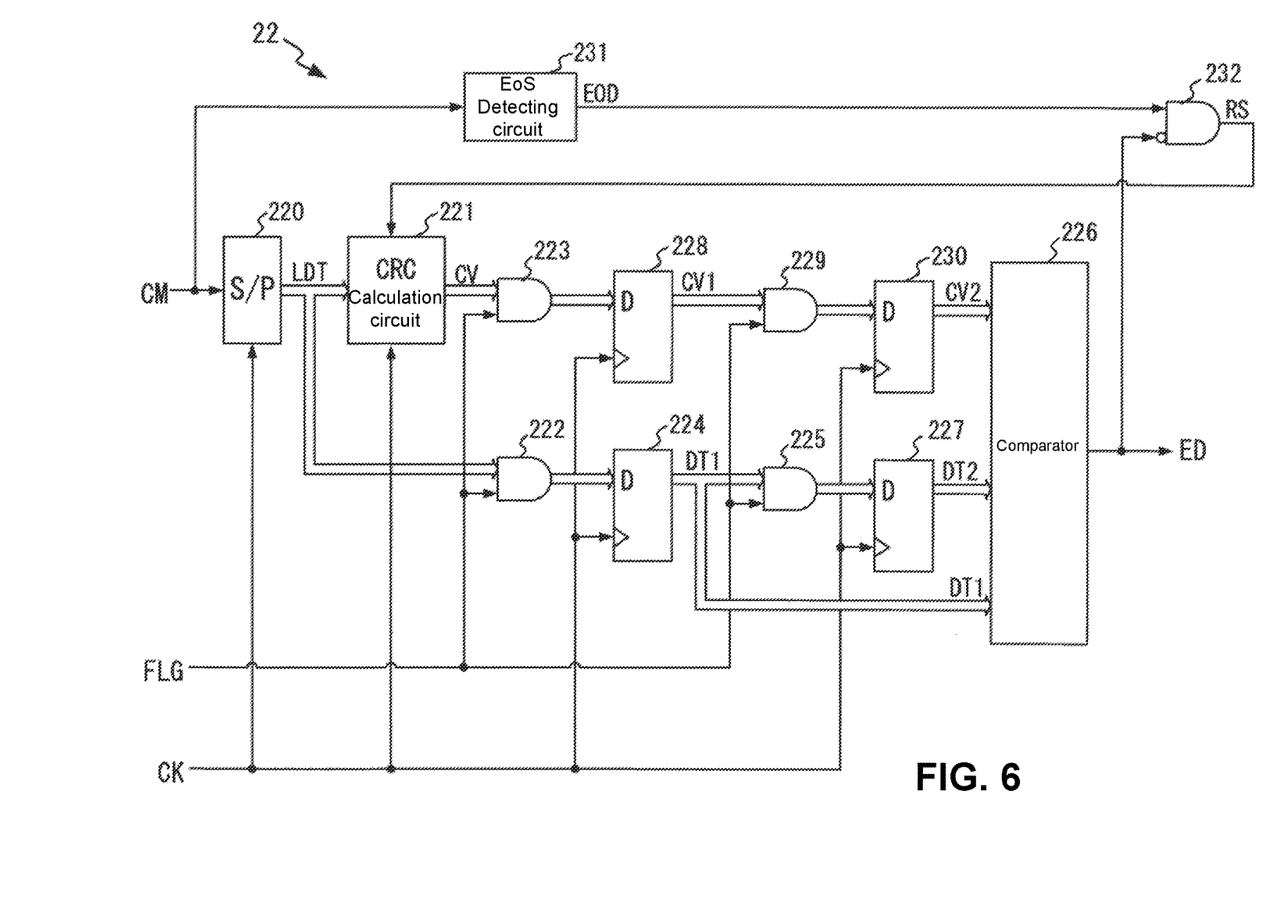
FIG. 6 is a circuit diagram showing a configuration of an end portion detection circuit of an IC tag of a communication system according to a second embodiment of the present invention.

FIG. 6 is a circuit diagram showing a configuration of the end portion detection circuit 22 of the IC tag 200 of the communication system according to the second embodiment of the present invention.

In the second embodiment, the end portion detecting portion 22 of the IC tag 200 has the configuration shown in FIG. 6 instead of the configuration shown in FIG. 4 in the first embodiment. As shown in FIG. 6, the end portion detecting portion 22 of the IC tag 200 includes an EoS detecting circuit 231 and an AND gate 232. It should be noted that the end portion detecting portion 22 has the configuration similar to the configuration shown in FIG. 4 in the first embodiment except the AND gate 232 and the CRC calculation circuit 231.

In the second embodiment, when the end data as the end portion EoS of the data having the specific bit pattern shown in FIG. 2 is detected from the command data signal CM, the EoS detecting circuit 231 is configured to generate an EoS detection signal EOD with the logic level "1" transited from the logic level "0". Then, the EoS detecting circuit 231 supplies the EoS detection signal EOD to the AND gate 232.

In the second embodiment, when the EoS detection signal EOD has the logic level "1" and the end detection signal ED has the logic level "0", the AND gate 232 supplies a reset signal RS to the CRC calculation circuit 221.

In the second embodiment, when the CRC calculation circuit 221 receives the reset signal RS, the CRC calculation circuit 221 stops performing the cyclic redundancy check calculation. Further, the CRC calculation circuit 221 resets all of the values of the data pieces retrieved up to that moment and the values obtained during the cyclic redundancy check calculation to zero.

An operation of the IC tag 200 and the wireless reader writer 100 having the configurations described above will be explained next with reference to a communication flow shown in FIG. 7.

Figure 7:
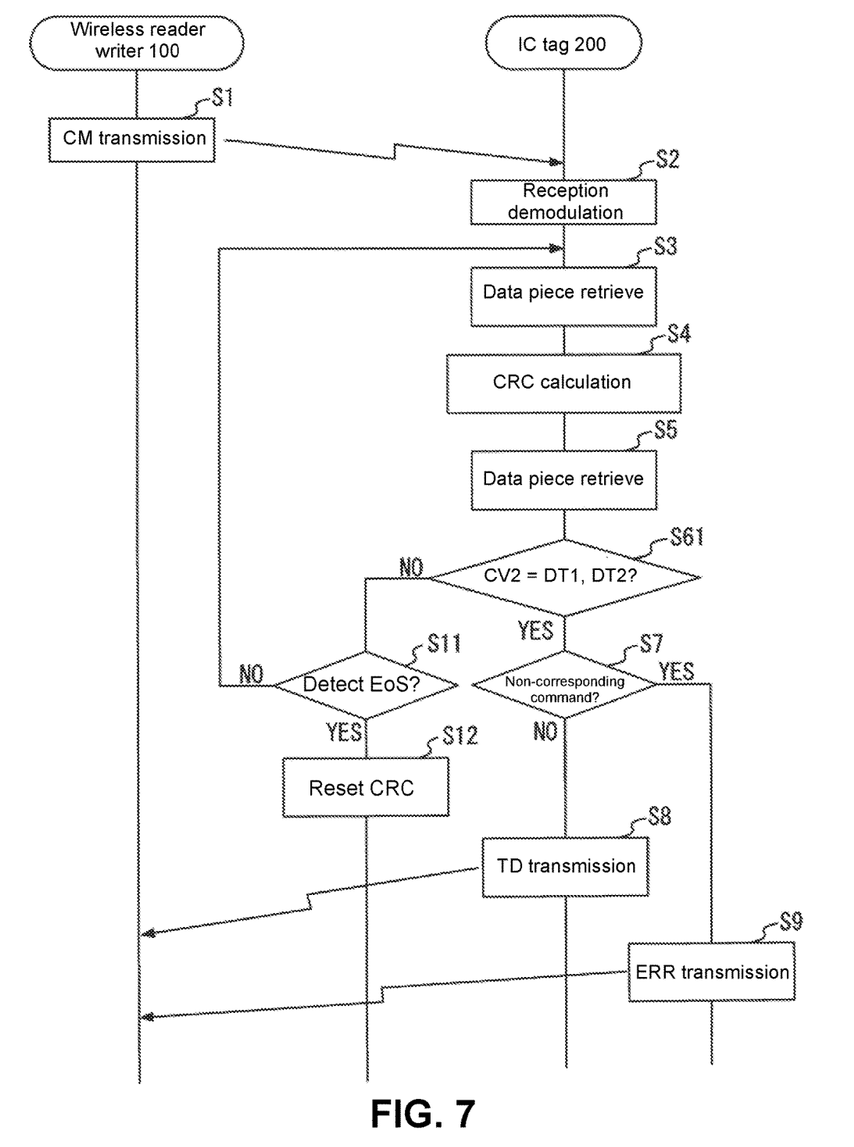
FIG. 7 is a flow chart showing an operation of the communication system according to the second embodiment of the present invention.

FIG. 7 is a flow chart showing the operation of the communication system according to the second embodiment of the present invention. As described above, the end portion detecting portion 22 has the configuration shown in FIG. 6.

In the second embodiment, it should be noted that additional steps S11 and S12 are included in the operation. Further, step S6 shown in FIG. 5 is replaced with step S61. Other steps, that is, step S1 to step S5 and step 7 to step S9, are identical to those shown in FIG. 5.

In step S61 shown in FIG. 7, the IC tag 200 determines whether the CRC calculation value data of 16 bits calculated in step S4 matches to the data piece of 16 bits (DT1, DT2) obtained in step S5. When the IC tag 200 determines that the CRC calculation value data matches to the data piece (DT1, DT2), the IC tag 200 performs the process in step S7 and step S8, or step S7 and step S9, similarly to the process shown in FIG. 5.

On the other hand, in step S61, when the IC tag 200 determines that the CRC calculation value data calculated in step S4 does not match to the data piece (DT1, DT2) obtained in step S5, the IC tag 200 determines whether the end portion EoS is detected from the command data signal CM in step S11. When the IC tag 200 determines that the end portion EoS is not detected from the command data signal CM in step S11, the IC tag 200 returns to step S3, so that the IC tag 200 performs the process from step S3 to step S5 and step S61 one more time.

In step S12, when the IC tag 200 determines that the end portion EoS is detected from the command data signal CM in step S11, the IC tag 200 resets the CRC calculation circuit 221, so that the IC tag 200 forces the CRC calculation circuit 221 to stop the operation. Accordingly, after step S12, the IC tag 200 stops responding to the wireless reader writer 100. As a result, after the wireless reader writer 100 becomes idle for a specific period of time, the wireless reader writer 100 becomes the time out state, so that a next process (not specified) will be performed.

As described above, in the second embodiment, even when the bit error occurs in the series of the data pieces d1 to d(E) of the command data signal CM, and the data end portion is not detected with the end detection signal ED, the CRC calculation circuit 221 immediately stops the operation thereof and becomes the idle state when the end portion EoS is detected in the command data signal CM.

Accordingly, the IC tag 200 does not respond to the wireless reader writer 100, and the wireless reader writer 100 becomes the time out state. During this period of time, the CRC calculation circuit 221 of the IC tag 200 is reset, so that the CRC calculation circuit 221 stops the operation thereof. Accordingly, it is possible to prevent the power consumption from wasting. Further, when the CRC calculation circuit 221 of the IC tag 200 is reset, the CRC calculation circuit 221 is capable of start detecting the data end portion of the command data signal CM immediately after the time out. Accordingly, it is possible to improve the communication efficiency.

The disclosure of Japanese Patent Application No. 2015-106983, filed on 27, 2015, is incorporated in the application by reference.

While the invention has been explained with reference to the specific embodiments of the invention, the explanation is illustrative and the invention is limited only by the appended claims.

What is claimed is:

1. A semiconductor communication device configured to execute an executable command and not to execute a non-executable command, said semiconductor communication device being configured to receive a data signal, in which a CRC (Cyclic Redundancy Check) data piece is arranged after a series of a plurality of data pieces, said data pieces representing a command, said CRC data piece representing a value calculated with a cyclic redundancy check calculation based on the data pieces, said semiconductor communication device being configured to perform transmission according to the executable command, said semiconductor communication device comprising:
   a CRC calculation portion configured to retrieve each of the data pieces and the CRC data piece as a retrieved data piece from the data signal, said CRC calculation portion being configured to perform the cyclic redundancy check calculation to obtain a CRC calculation value according to the retrieved data piece each time when the CRC calculation portion retrieves the retrieved data piece;
   a comparing portion configured to generate an end detection signal indicating that the comparing portion detects a data end portion of the data signal when the CRC calculation value matches a value indicated with a subsequently retrieved data piece subsequently retrieved after the retrieved data piece is retrieved before the CRC calculation portion retrieves the data end portion; and
   a communication responding portion configured to determine whether the command represented with the retrieved data piece is the non-executable command, said communication responding portion being configured to transmit a command error signal when the communication responding portion determines that the command is the non-executable command.

2. The semiconductor communication device according to claim 1, further comprising:
   an end data detecting circuit configured to detect end data having a specific bit pattern representing the data end portion, said end data being arranged in the data signal after the CRC data piece, and
   a resetting circuit configured to reset the CRC calculation portion when the end data detecting circuit detects the end data.

3. The semiconductor communication device according to claim 1, further comprising:
   a tag memory configured to store tag information,
   wherein said communication responding portion is configured to transmit a tag data signal representing the tag information stored in the tag memory when the communication responding portion determines that the command is not the non-executable command.

4. The semiconductor communication device according to claim 3, wherein said communication responding portion is configured to receive a wireless transmission wave through an antenna, and
   said communication responding portion is configured to transmit the wireless transmission wave representing the command error signal or the tag data signal through the antenna.

5. A communication system, comprising:
   a wireless reader writer configured to wirelessly transmit a data signal, in which a CRC (Cyclic Redundancy Check) data piece is arranged after a series of a plurality of data pieces, said data pieces representing a command, said CRC data piece representing a value calculated with a cyclic redundancy check calculation based on the data pieces; and
   a semiconductor tag configured to execute an executable command and not to execute a non-executable command, said semiconductor communication device being configured to perform wireless transmission relative to the wireless reader writer according to the executable command,
   wherein said semiconductor tag comprises:
   a CRC calculation portion configured to retrieve each of the data pieces and the CRC data piece as a retrieved data piece from the data signal, said CRC calculation portion being configured to perform the cyclic redundancy check calculation to obtain a CRC calculation value according to the retrieved data piece each time when the CRC calculation portion retrieves the retrieved data piece;
   a comparing portion configured to generate an end detection signal indicating that the comparing portion detects a data end portion of the data signal when the CRC calculation value matches a value indicated with a subsequently retrieved data piece subsequently retrieved after the retrieved data piece is retrieved before the CRC calculation portion retrieves the data end portion; and
   a communication responding portion configured to determine whether the command represented with the retrieved data piece is the non-executable command, said communication responding portion being configured to transmit a command error signal when the communication responding portion determines that the command is the non-executable command.

6. The communication system according to claim 5, wherein said semiconductor tag further comprises:
   an end data detecting circuit configured to detect end data having a specific bit pattern representing the data end portion, said end data being arranged in the data signal after the CRC data piece, and
   a resetting circuit configured to reset the CRC calculation portion when the end data detecting circuit detects the end data.

7. The semiconductor communication device according to claim 6, wherein said semiconductor tag further includes a tag memory configured to store tag information, and
   said communication responding portion is configured to transmit a tag data signal representing the tag information stored in the tag memory when the communication responding portion determines that the command is not the non-executable command.

8. The semiconductor communication device according to claim 7, wherein said communication responding portion is configured to receive a wireless transmission wave through an antenna, and
   said communication responding portion is configured to transmit the wireless transmission wave representing the command error signal or the tag data signal through the antenna.

9. A communication method of a communication device configured to execute an executable command and not to execute a non-executable command, said semiconductor communication device being configured to receive a data signal, in which a CRC (Cyclic Redundancy Check) data piece is arranged after a series of a plurality of data pieces, said data pieces representing a command, said CRC data piece representing a value calculated with a cyclic redundancy check calculation based on the data pieces, said communication device being configured to perform transmission according to the executable command, said communication method comprising the steps of:
retrieving each of the data pieces and the CRC data piece as a retrieved data piece from the data signal;
performing the cyclic redundancy check calculation to obtain a CRC calculation value according to the retrieved data piece each time when the CRC calculation portion retrieves the retrieved data piece;
retrieving one of the data pieces as a subsequently retrieved data piece subsequently retrieved after the retrieved data piece is retrieved; and
transmitting a command error signal before the CRC calculation portion retrieves an end portion of the data signal when the CRC calculation value matches a value command represented with the subsequently retrieved data piece and the command represented with the data pieces is the non-executable command.

* * * * *